US010415428B2

(12) United States Patent
Spangler et al.

(10) Patent No.: US 10,415,428 B2
(45) Date of Patent: Sep. 17, 2019

(54) DUAL CAVITY BAFFLE

(71) Applicant: United Technologies Corporation, Farmington, CT (US)

(72) Inventors: Brandon W. Spangler, Vernon, CT (US); Corey D. Anderson, East Hartford, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/884,500

(22) Filed: Jan. 31, 2018

(65) Prior Publication Data

US 2019/0234236 A1 Aug. 1, 2019

(51) Int. Cl.
| | |
|---|---|
| *F04F 5/16* | (2006.01) |
| *F04F 5/46* | (2006.01) |
| *F04D 17/16* | (2006.01) |
| *F04D 25/06* | (2006.01) |
| *F04D 25/08* | (2006.01) |
| *F04D 25/16* | (2006.01) |
| *F04D 29/42* | (2006.01) |
| *F04D 29/66* | (2006.01) |
| *F01D 11/00* | (2006.01) |
| *F01D 5/08* | (2006.01) |
| *F01D 5/06* | (2006.01) |
| *F01D 25/12* | (2006.01) |
| *F02C 3/04* | (2006.01) |
| *F16J 15/16* | (2006.01) |

(Continued)

(52) U.S. Cl.
CPC ............. *F01D 25/12* (2013.01); *F01D 9/041* (2013.01); *F02C 3/06* (2013.01); *F05D 2220/32* (2013.01); *F05D 2240/121* (2013.01); *F05D 2240/122* (2013.01); *F05D 2260/201* (2013.01); *F05D 2260/221* (2013.01)

(58) Field of Classification Search
CPC .......... F01D 5/186; F01D 5/188; F01D 9/065; F05D 2220/31; F05D 2240/81
USPC ...................................... 416/97, 96; 415/115
See application file for complete search history.

(56) References Cited

U.S. PATENT DOCUMENTS 5,207,556 A * 5/1993 Frederick ................ F01D 5/189
  415/115
5,320,485 A * 6/1994 Bourguignon .......... F01D 5/187
  415/115

(Continued)

*Primary Examiner* — Nathaniel E Wiehe
*Assistant Examiner* — David Whittaker
(74) *Attorney, Agent, or Firm* — Carlson, Gaskey & Olds, P.C.

(57) ABSTRACT

A component for a gas turbine engine according to example of the present disclosure includes a body that has an airfoil extending between a radially inner platform and a radially outer platform, and that has an internal cavity within the airfoil. A baffle is disposed within the internal cavity. The baffle defines first and second baffle cavities that are separated by a baffle dividing wall extending between the radially inner platform and the radially outer platform. An impingement plate is spaced apart from one of the radially inner and outer platforms, includes a first opening that provides fluid communication between a first chamber and the first baffle cavity, and includes a plurality of second openings that are smaller than the first opening and provide fluid communication between the first chamber and the second baffle cavity via a second chamber.

21 Claims, 7 Drawing Sheets

(51) Int. Cl.
*F16J 15/447* (2006.01)
*F01D 9/04* (2006.01)
*F02C 3/06* (2006.01)

(56) References Cited

U.S. PATENT DOCUMENTS

| | | | |
|---|---|---|---|
| 6,514,046 B1 * | 2/2003 | Morrison | F01D 5/187 |
| | | | 416/229 A |
| 7,008,185 B2 | 3/2006 | Peterman et al. | |
| 7,921,654 B1 * | 4/2011 | Liang | F01D 5/186 |
| | | | 415/115 |
| 9,500,087 B2 | 11/2016 | Davis | |
| 2015/0030461 A1 * | 1/2015 | Mugglestone | F01D 5/188 |
| | | | 416/97 R |
| 2015/0226072 A1 | 8/2015 | Bluck | |

\* cited by examiner

DUAL CAVITY BAFFLE

STATEMENT REGARDING FEDERALLY SPONSORED RESEARCH OR DEVELOPMENT

This invention was made with Government support under W58RGZ-16-C-0046 awarded by the United States Army. The Government has certain rights in this invention.

BACKGROUND

This application relates to cooling a component of a gas turbine engine, and more particularly to a dual cavity baffle for cooling a component.

Gas turbine engines are known and typically include a fan delivering air for propulsion and for cooling components. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

Stator vanes are positioned adjacent to turbine blades in a gas turbine and are subject to high temperatures. In one known cooling scheme for a stator vane, a baffle defines a single baffle cavity that is disposed within an interior cavity of the stator vane, and cooling air is directed outwards from within the single baffle cavity to the interior cavity.

SUMMARY

A component for a gas turbine engine according to example of the present disclosure includes a body that has an airfoil extending between a radially inner platform and a radially outer platform, and that has an internal cavity within the airfoil. A baffle is disposed within the internal cavity. The baffle defines first and second baffle cavities that are separated by a baffle dividing wall extending between the radially inner platform and the radially outer platform. An impingement plate is spaced apart from one of the radially inner and outer platforms, includes a first opening that provides fluid communication between a first chamber and the first baffle cavity, and includes a plurality of second openings that are smaller than the first opening and provide fluid communication between the first chamber and the second baffle cavity via a second chamber.

In a further embodiment of any of the foregoing embodiments, the first baffle cavity extends in a radial direction beyond the one of the inner and outer diameter platforms to the impingement plate at a first end, and a terminal end of the second baffle cavity proximate to the one of the radially inner and outer platforms is spaced apart from the impingement plate.

In a further embodiment of any of the foregoing embodiments, the second baffle cavity is open at both of its opposing ends, and the first baffle cavity is closed at a second end that is opposite the first end of the first baffle cavity.

In a further embodiment of any of the foregoing embodiments, the first baffle cavity is situated proximate to a leading edge of the airfoil, and the second baffle cavity is situated proximate to a trailing edge of the airfoil.

In a further embodiment of any of the foregoing embodiments, the first baffle cavity is situated proximate to a trailing edge of the airfoil, and the second baffle cavity is situated proximate to a leading edge of the airfoil.

In a further embodiment of any of the foregoing embodiments, a U-shaped collar extends between the one of the radially inner and outer platforms and the impingement plate and surrounds a portion of the baffle.

In a further embodiment of any of the foregoing embodiments, the collar comprises ends that terminate at the baffle dividing wall.

In a further embodiment of any of the foregoing embodiments, the baffle dividing wall is free of openings between the first and second cavities.

In a further embodiment of any of the foregoing embodiments, the second chamber is fluidly isolated from the first baffle cavity.

In a further embodiment of any of the foregoing embodiments, the impingement plate is free of openings within a profile of the second baffle cavity.

In a further embodiment of any of the foregoing embodiments, one of the first and second baffle cavities is disposed along a leading edge of the baffle and includes a plurality of sidewall openings that are disposed between the radially inner and radially outer platforms and that open to the internal cavity for directing cooling air from within the one of the first and second cavities to the internal cavity.

In a further embodiment of any of the foregoing embodiments, a second of the first and second cavities is free of sidewall openings.

In a further embodiment of any of the foregoing embodiments, a second of the first and second cavities comprises a quantity of sidewall openings that is less than a quantity of sidewall openings of the one of the first and second cavities.

In a further embodiment of any of the foregoing embodiments, the one of the radially inner and outer platforms is the radially outer platform.

In a further embodiment of any of the foregoing embodiments, the one of the radially inner and outer platforms is the radially inner platform.

In a further embodiment of any of the foregoing embodiments, the body having an airfoil includes a stator vane.

A gas turbine engine according to an example of the present disclosure includes a compressor section, a combustor section in fluid communication with the compressor section, and a turbine section in fluid communication with the combustor section. The turbine section has an engine component that extends between a radially inner platform and a radially outer platform and includes an airfoil that has an internal cavity. A baffle is disposed within the internal cavity. The baffle defines first and second baffle cavities that are separated by a baffle dividing wall that extends between the radially inner platform and the radially outer platform. An impingement plate spaced apart from one of the radially inner and outer platforms, includes a first opening that provides fluid communication between a first chamber and the first baffle cavity, and includes a plurality of second openings that are smaller than the first opening and provide fluid communication between the first chamber and the second baffle cavity via a second chamber. The first chamber is in fluid communication with a source of cooling air.

In a further embodiment of any of the foregoing embodiments, the first baffle cavity extends in a radial direction beyond the one of the inner and outer diameter platforms to the impingement plate at a first end, and a terminal end of the second baffle cavity proximate to the one of the radially inner and outer platforms is spaced apart from the impingement plate.

In a further embodiment of any of the foregoing embodiments, one of the first and second baffle cavities is disposed along a leading edge of the baffle and comprises a plurality of sidewall openings that are disposed between the radially inner and outer platforms and that open to the internal cavity for directing cooling air from within the one of the first and second cavities to the internal cavity.

In a further embodiment of any of the foregoing embodiments, a U-shaped collar extends between the one of the radially inner and outer platforms and the impingement plate and surrounds a portion of the baffle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
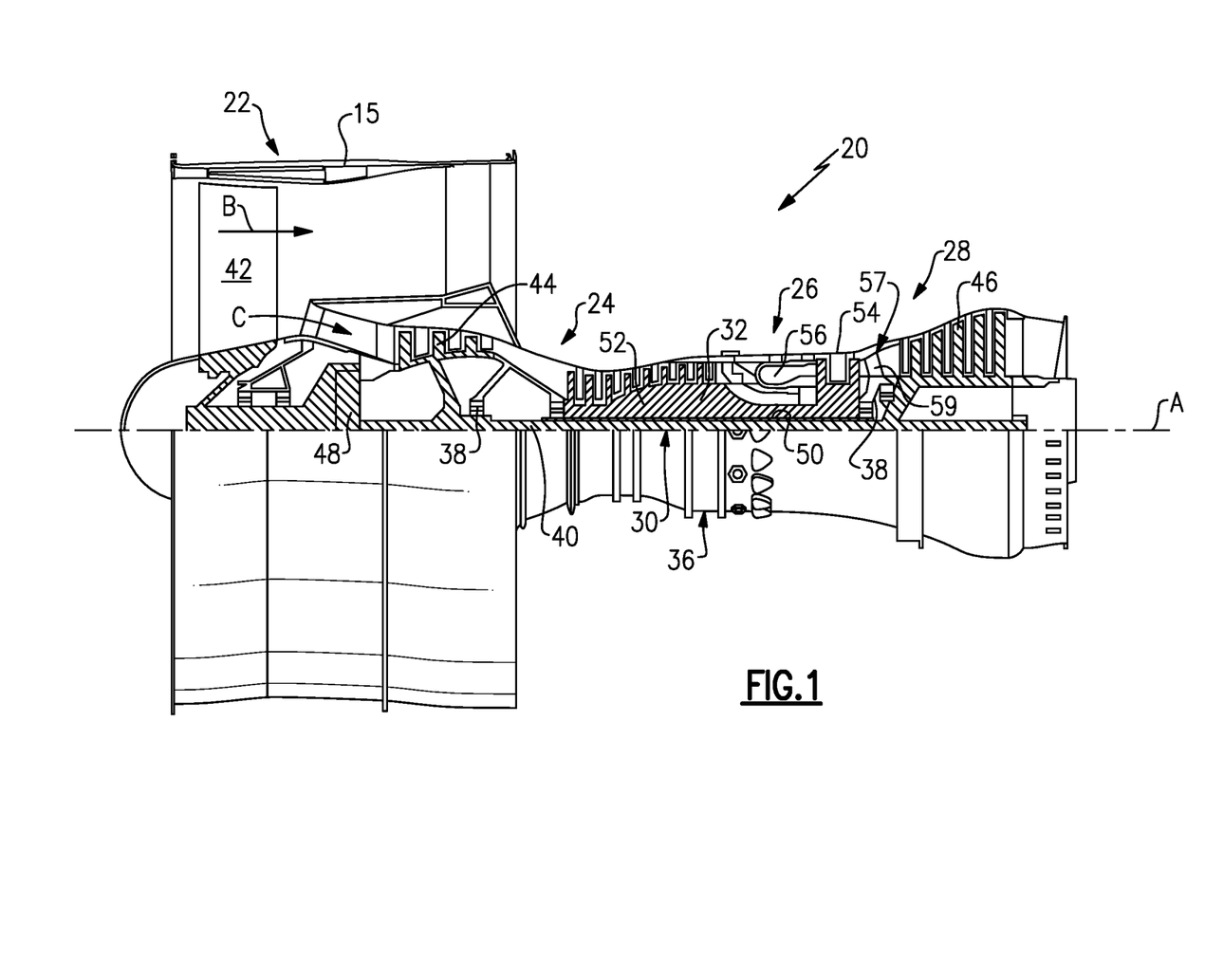
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

Figure 2A:
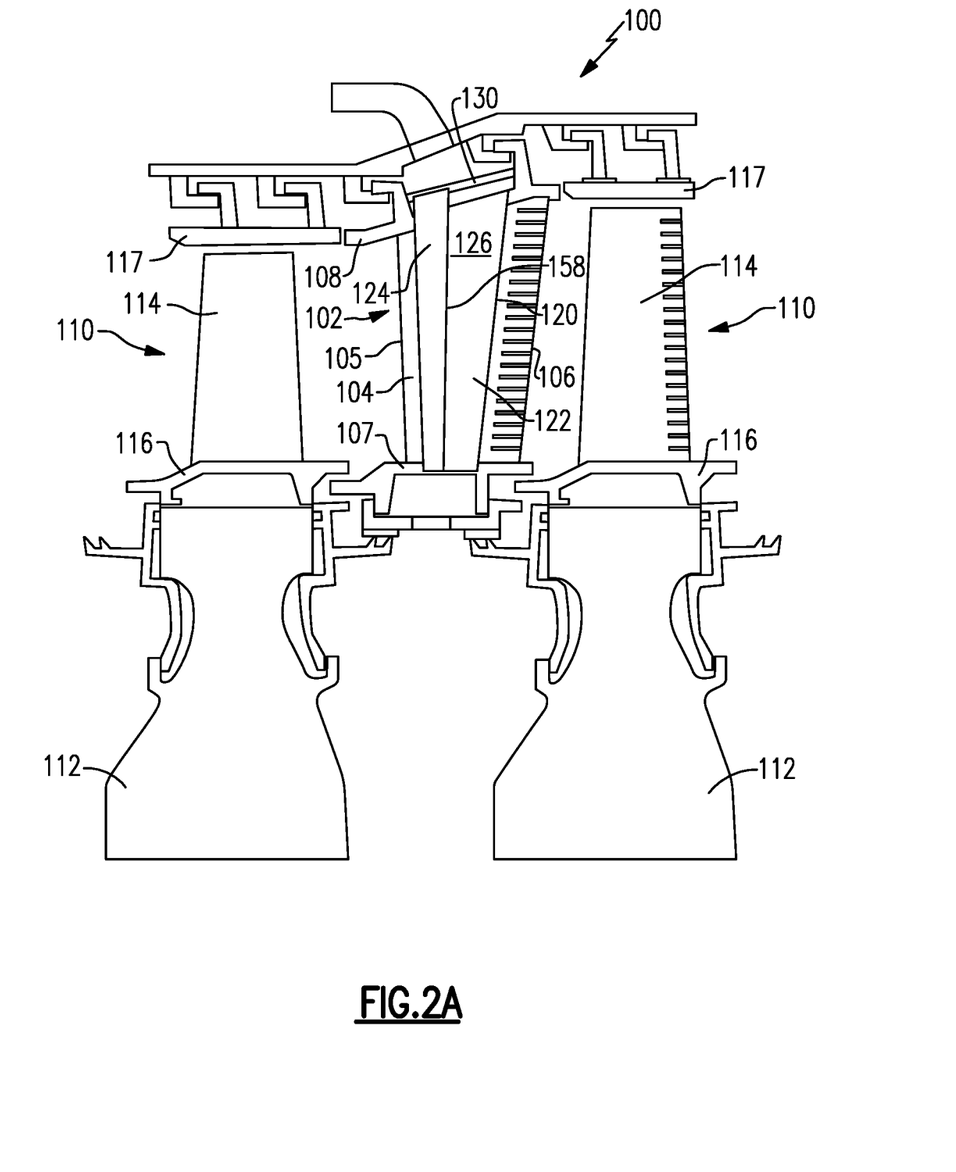
FIGS. 2A-B are schematic views of an example section of a gas turbine engine.

FIG. 2A shows selected portions of a section 100 of a gas turbine engine, such as a portion of the turbine section 28 of the gas turbine engine 20 of FIG. 1. In this disclosure, for reference numerals 100 and beyond, like reference numerals designate like elements where appropriate, and reference numerals with the addition of one-hundred or multiples thereof designate modified elements that are understood to incorporate the same features and benefits of the corresponding original elements. In this example, the section 100 includes a vane section 102 having a stator vane 104 that has an airfoil shape and has a leading edge 105 and a trailing edge 106. The stator vane 104 extends between a radially inner platform 107 and a radially outer platform 108. In this disclosure, "radially inner" and "radially outer" refer to the engine central longitudinal axis A.

The vane section 102 is spaced axially away from rotor sections 110 with respect to the engine central longitudinal axis A. The rotor sections 110 each include a rotor disk 112 carrying one or more blades 114 extending from a platform 116 for rotation about the engine central longitudinal axis A. In the example of FIG. 2A, the rotor sections 110 also include a blade outer air seal 117 ("BOAS") situated radially outward of the blades 114.

The stator vane 104 includes an internal cavity 120 that extends radially outward from the radially inner platform 107 to the radially outer platform 108. A baffle 122 is a part that is disposed within the internal cavity 120 of the stator vane 104. The baffle 122 is a dual cavity baffle that defines a first baffle cavity 124 and an adjacent second baffle cavity 126 that are separated by a dividing wall 158. The baffle cavities 124, 126 extend from the radially inner platform 107 to the radially outer platform 108. The first baffle cavity 124 is situated proximate to the leading edge 105 of the stator vane 104, and the second baffle cavity 126 is situated proximate to the trailing edge 106 of the stator vane 104.

Figure 2B:
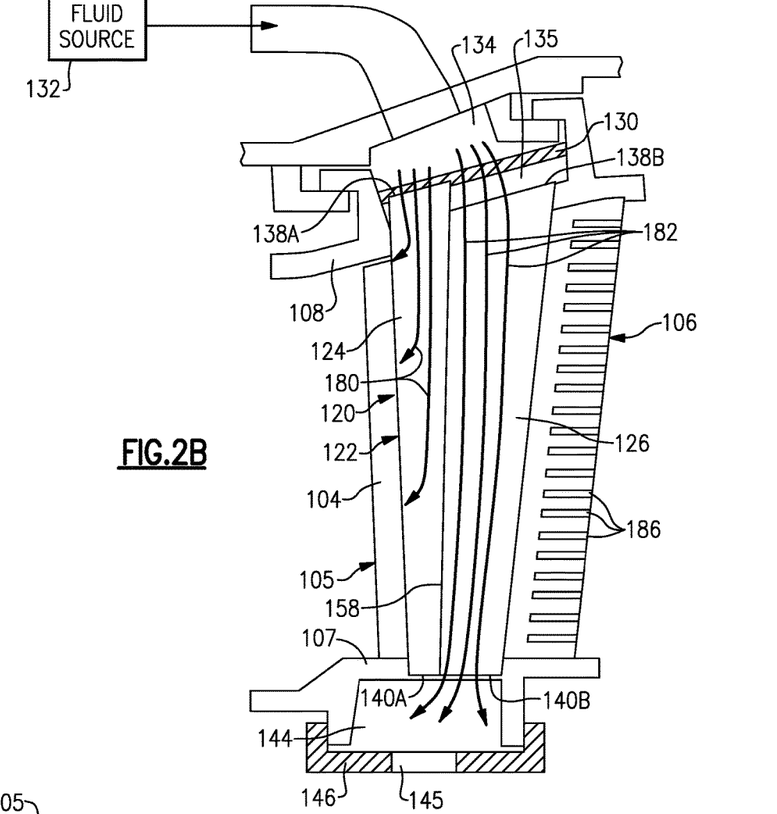

FIG. 2B is an enlarged schematic view of the stator vane 104 and baffle 122 of FIG. 2A. As shown in FIGS. 2A-B, the first baffle cavity 124 extends radially outward beyond the radially outer platform 108 and the second baffle cavity 126 to an impingement plate 130 that is spaced apart from the radially outer platform 108. The second baffle cavity 126 is spaced away from the impingement plate 130, and does not extend all the way to the impingement plate 130.

The impingement plate 130 acts as a divider between a first outer diameter (OD) chamber 134 and a second OD chamber 135 that is radially inward of the first OD chamber 134. The impingement plate 130 and radially outer platform 108 at least partially define the second OD chamber 135. In one example, the first OD chamber 134 is in fluid communication with the first baffle cavity 124 and the second OD chamber 135, and the second OD chamber 135 is in fluid communication with the second baffle cavity 126 and is fluidly isolated from the first baffle cavity 124.

The first and second baffle cavities 124, 126 include a respective first end 138A-B that is proximate to the radially outer platform 108, and also include a respective second end 140A-B that is proximate to the radially inner platform 107. The respective first ends 138A-B are opposite the respective second ends 140A-B.

The first baffle cavity 124 opens to OD chamber 134 at its first end 138A and is closed at end 140A. The second baffle cavity 126 is open at both of its ends 138B, 140B. In particular, the second baffle cavity 126 opens to OD chamber 135 at its end 138B, and opens to an inner diameter (ID) chamber 144 at its end 140B.

FIG. 2B illustrates how the baffle cavities 124, 126 and impingement plate 130 provide for two distinct flow paths for cooling air that flows radially inward from a source 132. The first flow path is generally shown as 180, and the second flow path is generally shown as 182.

Figure 2C:
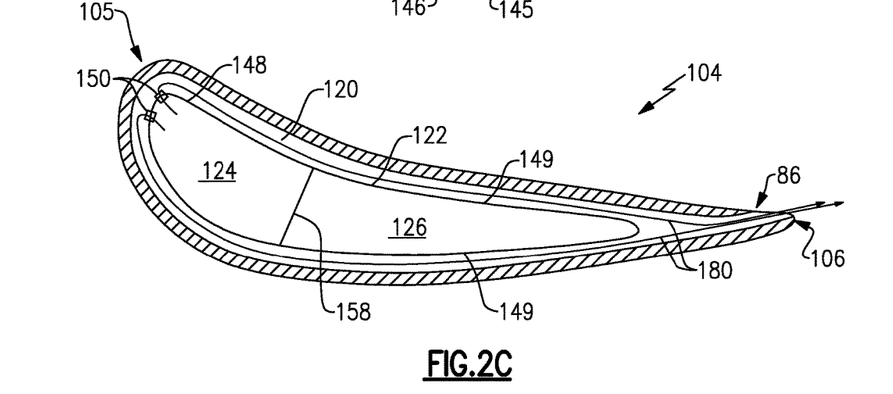
FIG. 2C is a cross-sectional view of a stator vane

In the first flow path 180, cooling air is fluidly communicated from the source 132 into the first OD chamber 134, into the first baffle cavity 124, and then out sidewall impingement openings 150 (see FIG. 2C and FIG. 3) along a leading edge of the first baffle cavity 124 for impingement cooling of the stator vane 104. The cooling air in the first flow path 180 then travels axially through internal cavity 120 and exits out apertures 86 in the trailing edge 106 of stator vane 104 (see FIG. 2B and FIG. 2C).

In the second flow path 182, cooling air is fluidly communicated from the source 132 into the first OD chamber 134, through the impingement plate 130 into the second OD chamber 135 where it contacts and cools the radially outer platform 108 (see FIG. 5), and then through the second baffle cavity 126 into the ID chamber 144, and through an orifice 145 in an inner air seal 146.

Figure 3:
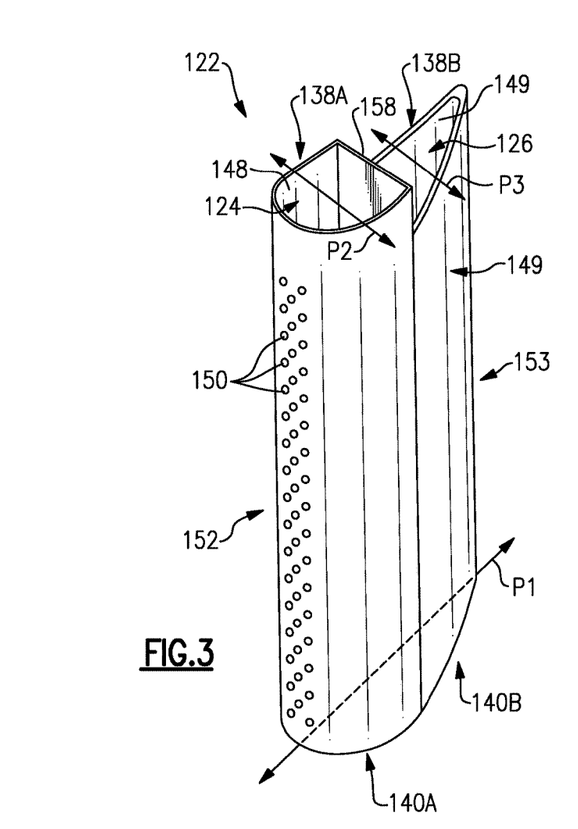
FIG. 3 illustrates an example baffle.

Referring now to FIG. 3, an example baffle 122 is shown outside of the internal cavity 120. As shown in FIG. 3, the respective ends 140A-B of the first baffle cavity 124 and second baffle cavity 126 are flush with each other, and the respective ends 138A-B of the first baffle cavity 124 and second baffle cavity 126 are radially offset from each other. In one example, by being "offset" from each other, the ends 138A-B are not coplanar. In one example, the ends 140A-B lie in a plane P1, the end 138A lies in a plane P2, and the end 138B lies in a plane P3 that is offset from and not coplanar with the plane P2. In one example, when the baffle 122 is assembled into the internal cavity 120 of the stator vane 104, the plane P2 is further radially outward than the plane P3. In one example, the radially inner ends 140A-B of the baffle 122 are offset and not flush with each other, and the radially outer ends 183A-B of the baffle 122 are also offset and not flush with each other.

The first baffle cavity 124 is defined by a longitudinal sidewall 148 that extends along a leading edge 152 of the baffle 122 and the dividing wall 158. The second baffle cavity 126 is defined by the dividing wall 158 and a pair of second longitudinal sidewalls 149 that converge at a trailing edge 153 of the baffle 122. The dividing wall 158 separates the first baffle cavity 124 and second baffle cavity 126.

FIG. 3 shows a first quantity of sidewall impingement openings 150 disposed in sidewall 148 along a leading edge 152 of the baffle 122 between the opposing ends 138A, 140A of the first baffle cavity 124. In various embodiments, the impingement openings 150 may be disposed anywhere in sidewall 148 (e.g., locations other than or in addition to the leading edge 152). In one example, the dividing wall 158 between first baffle cavity 124 and second baffle cavity 126 is free of impingement openings. In the example of FIG. 3, the longitudinal sidewalls 149 of the second baffle cavity 126 are also free of sidewall impingement openings 150. In other embodiments, one or both of the sidewalls 149 of the second baffle cavity 126 contain impingement openings 150 (e.g., along a trailing edge 153 of the baffle 122), but include a lower quantity than the sidewall 148.

Figure 4:
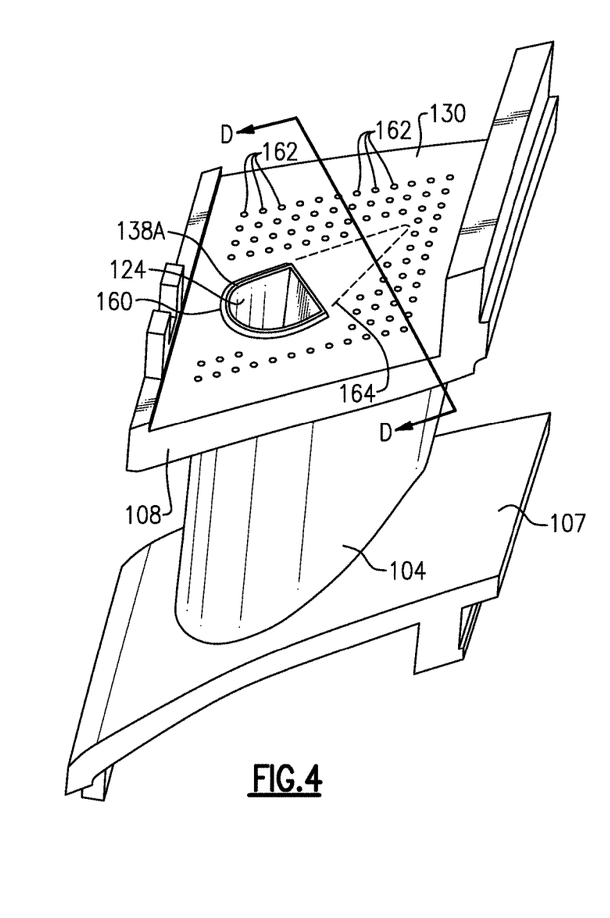
FIG. 4 illustrates the baffle of FIG. 3 within a stator vane, and an example impingement plate for the baffle.

FIG. 4 illustrates an example impingement plate 130 for the baffle 122. As shown in FIG. 4, the impingement plate 130 includes a first opening 160 that opens to the first baffle cavity 124, and also includes a plurality of second openings 162 that open to the second OD chamber 135. The quantity of second openings 162 is greater than the quantity of first openings 160, and the second openings 162 are smaller than the first opening 160.

In the example of FIG. 4, the impingement plate 130 includes a single first opening 160 for the first baffle cavity 124, and that opening 160 is slightly larger than the first end 138A of the first baffle cavity 124. A profile 164 of the second baffle cavity 126 is shown in dotted lines. In the example of FIG. 4, the impingement plate 130 is free of openings within the profile 164. However, other embodiments of impingement plate 130 may contain openings 162 within profile 164 of the second baffle cavity 126.

Figure 5:
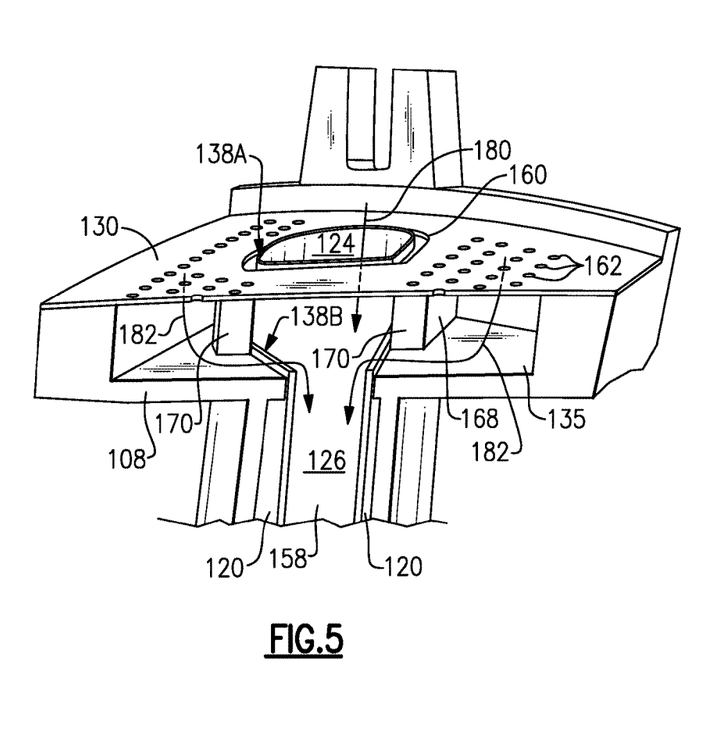
FIG. 5 illustrates a view of a stator vane and impingement plate taken along line D-D of FIG. 4.

FIG. 5 illustrates a view of the stator vane 104 and impingement plate 130 taken along line D-D of FIG. 4. As shown in FIG. 5, the plurality of second openings 162 open to the second OD chamber 135. The first cooling flow path 180 is provided to the interior of first baffle cavity 124 through opening 160 in the impingement plate 130. The second cooling flow path 182 passes through the openings 162 of the impingement plate 130 into the second OD chamber 135, where it cools the radially outer platform 108, and then enters the baffle cavity 126 from which it is communicated through the baffle cavity 126 into radially inner chamber 144, and then through an orifice 145 in inner air seal 146.

As shown in FIG. 5, the first end 138B of the second baffle cavity 126 is radially spaced apart from the impingement plate 130 and terminates proximate to the radially outer platform 108. A U-shaped collar 168 extends from the radially outer platform 108 to the impingement plate 130 and surrounds a portion of the first baffle cavity 124. The collar 168 includes ends 170 that terminate at the dividing wall 158. FIG. 5 also illustrates how cooling air in the second flow path 182 contacts and cools the radially outer platform 108 before passing into the second baffle cavity 126.

Figure 6:
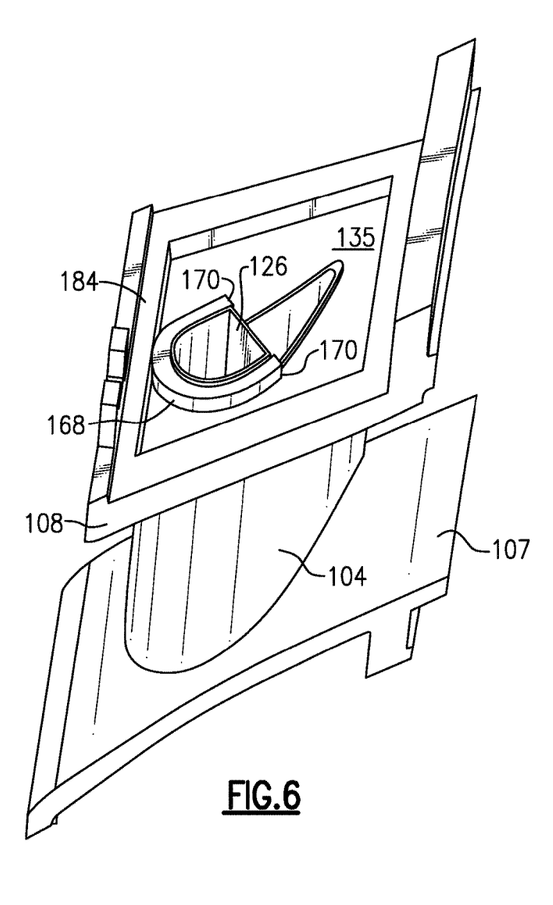
FIG. 6 illustrates a view of a baffle and stator vane of FIG. 4 with the impingement plate removed.

FIG. 6 illustrates a view of the baffle 122 and stator vane 104 as shown in FIG. 4 but with the impingement plate 130 removed. In the example of FIG. 6, the collar 168 extends from the radially outer platform 108 and merges with a sidewall 184 of the OD chamber 135. In another example, the collar 168 is separate from sidewall 184, leaving a gap between the collar 168 and sidewall 184.

Traditional baffled vane cooling designs take a single source of cooling air and use it to cool a radially outer platform, provide airfoil cooling, and provide vane throughflow. Because this air is used to do three things, vane design is constrained. The arrangements proposed herein provide for a dual-cavity baffle 122 that is paired with impingement plate 130 that allows supply air to be separated into air that is used to cool the stator vane 104 (flow 180) and throughflow air that is used to cool the radially outer platform 108 (flow 182). Because the flow 180 passes through a large impingement opening 160 in the impingement plate and not through a plurality of the smaller openings 162, the first flow 180 avoids picking up heat and losing pressure, and is therefore able to provide better cooling to the stator vane 104. This allows the cooling air that is communicated into the first baffle cavity 124 with flow 180 for cooling the stator vane 104 to be cooler and of a higher pressure than the cooling air that is communicated into the second baffle cavity with flow 182 for through-flow. This provides for increased transfer of heat away from the stator vane 104 as compared to a conventional baffle, reduced part temperatures, and improved part life.

Figure 7:
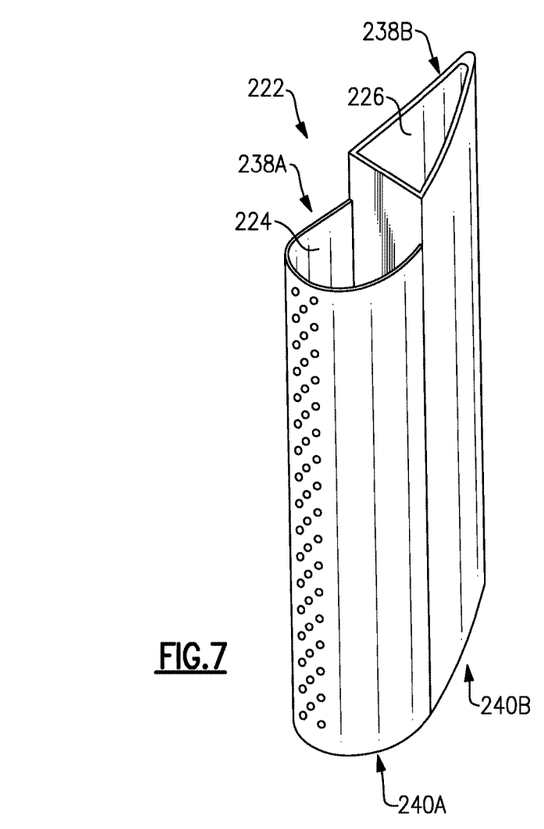
FIG. 7 illustrates another example baffle.

FIG. 7 illustrates another example baffle 222 in which second baffle cavity 226 extends further radially outward than the first baffle cavity 224. The respective ends 240A-B of the first baffle cavity 224 and second baffle cavity 226 are flush with each other, and the respective ends 238A-B of the first baffle cavity 224 and second baffle cavity 226 are radially offset from each other. In one example, the first baffle cavity 224 is closed at its end 240A and the second baffle cavity 226 is open at its end 240B.

Figure 8:
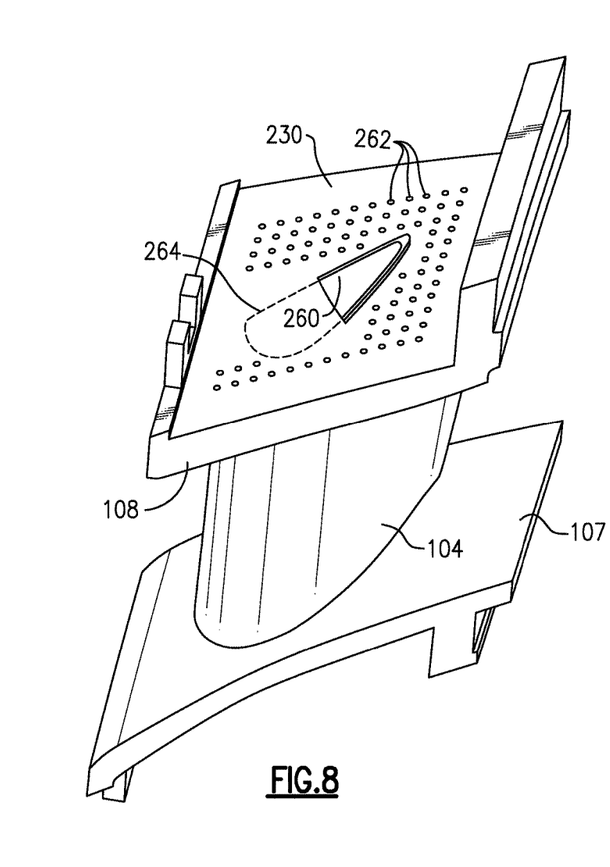
FIG. 8 illustrates an example impingement plate for the baffle of FIG. 7.

FIG. 8 illustrates an example impingement plate 230 for the baffle 222 of FIG. 7. The impingement plate 230 includes a first opening 260 that opens to the second baffle cavity 226, and also includes a plurality of second openings 262 that open to the second OD chamber 135. The quantity of second openings 262 is greater than the quantity of first openings 260, and the second openings 262 are smaller than the first opening 260. In the example of FIG. 8, the impingement plate 230 includes a single first opening 260 for the second baffle cavity 226 that is slightly larger than the first end 238B of the second baffle cavity 226.

A profile 264 of the first baffle cavity 224 is shown in dotted lines. In the example of FIG. 8, the impingement plate 230 is free of openings within the profile 264. This arrangement provides for cooler and higher pressure air for throughflow into the second baffle cavity 226.

Figure 9:
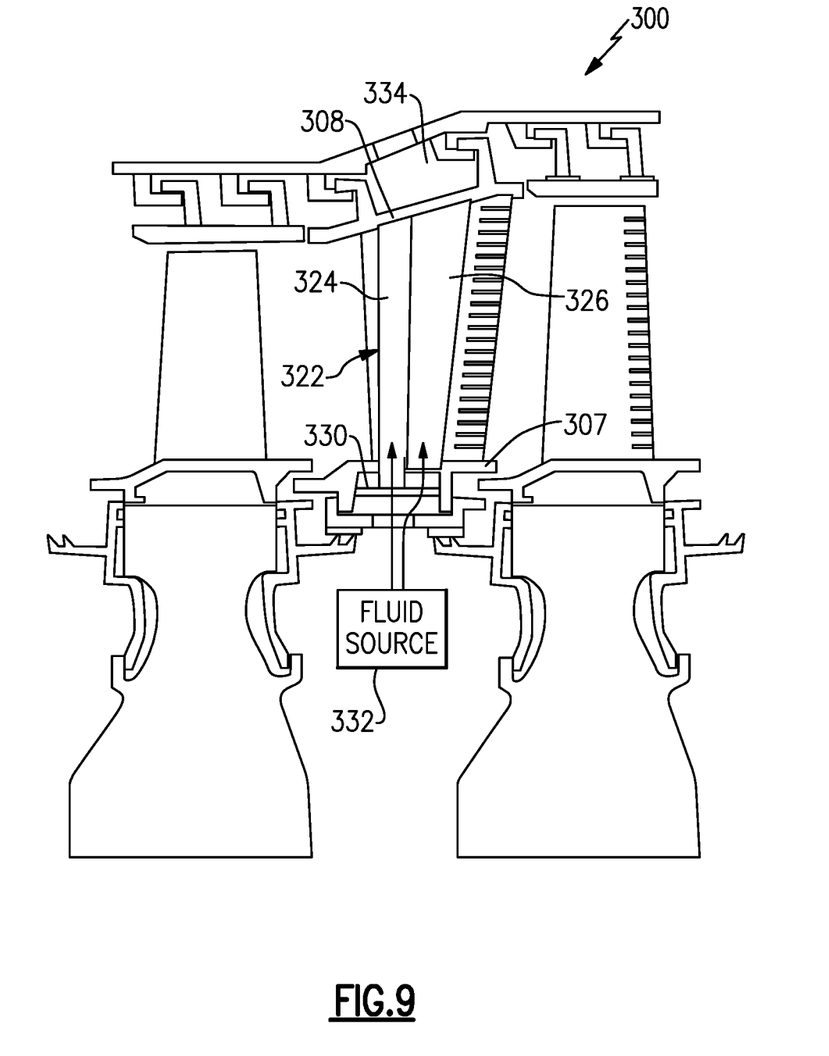
FIG. 9 is a schematic view of another example section of a gas turbine engine.

FIG. 9 illustrates another example section 300 of a gas turbine engine in which an impingement plate 330 is disposed radially inward of both a baffle 322 and an inner diameter platform 307, and a source of cooling air 332 communicates cooling air radially outward.

A baffle 322 defines a first baffle cavity 324 and a second baffle cavity 326. The first baffle cavity 324 extends radially inward beyond the radially inner platform 307 to the impingement plate 330, and the second baffle cavity 326 is spaced apart from impingement plate 330 and terminates proximate to the radially inner platform 307. The source 332 is in fluid communication with the baffle cavities 324, 326. In one example, the second baffle cavity 326 provides for through-flow that passes to OD chamber 334, while the first baffle cavity 324 is closed at an end proximate to OD chamber 334, and fluidly communicates cooling air from source 332 through sidewall impingement openings along a leading edge of the first baffle cavity 324 for impingement cooling of the stator vane 104. In one example, the first baffle cavity 324 and second baffle cavity 326 are flush at their respective radially outer ends.

In a further example, it is the second baffle cavity 326 that extends to the impingement plate 330 and the first baffle cavity 324 that is spaced apart from the impingement plate 330 and terminates proximate to the radially inner platform 307. In one such example, it is the second baffle cavity 326 that provides for through-flow radially outward to the OD chamber 334.

Although example embodiments have been disclosed, a worker of ordinary skill in this art would recognize that certain modifications would come within the scope of this disclosure. For that reason, the following claims should be studied to determine the scope and content of this disclosure.

What is claimed is:
1. A component for a gas turbine engine comprising:
   a body having an airfoil extending between a radially inner platform and a radially outer platform, and having an internal cavity within the airfoil;
   a baffle disposed within the internal cavity, the baffle defining first and second baffle cavities that are separated by a baffle dividing wall extending between the radially inner platform and the radially outer platform; and an impingement plate spaced apart from one of the radially inner and outer platforms, the impingement plate comprising a first opening that provides fluid communication between a first chamber and the first baffle cavity, and a plurality of second openings that are smaller than the first opening and provide fluid communication between the first chamber and the second baffle cavity via a second chamber;

wherein the impingement plate is free of openings within a profile of the second baffle cavity.

2. The component of claim 1, wherein the first baffle cavity extends in a radial direction beyond said one of the inner and outer diameter platforms to the impingement plate at a first end, and a terminal end of the second baffle cavity proximate to said one of the radially inner and outer platforms is spaced apart from the impingement plate.

3. The component of claim 2, wherein the second baffle cavity is open at both of its opposing ends, and the first baffle cavity is closed at a second end that is opposite the first end of the first baffle cavity.

4. The component of claim 1, wherein said first baffle cavity is situated proximate to a leading edge of said airfoil, and said second baffle cavity is situated proximate to a trailing edge of said airfoil.

5. The component of claim 1, wherein said first baffle cavity is situated proximate to a trailing edge of said airfoil, and said second baffle cavity is situated proximate to a leading edge of said airfoil.

6. The component of claim 1, comprising a U-shaped collar extending between said one of the radially inner and outer platforms and said impingement plate and surrounding a portion of the baffle, the U-shaped collar comprising an edge that terminates at said one of the radially inner and outer platforms.

7. The component of claim 6, wherein the collar comprises ends that terminate at the baffle dividing wall.

8. The component of claim 1, wherein the baffle dividing wall is free of openings between the first and second cavities.

9. The component of claim 1, wherein the second chamber is fluidly isolated from the first baffle cavity.

10. The component of claim 1, wherein one of the first and second baffle cavities is disposed along a leading edge of the baffle and comprises a plurality of sidewall openings that are disposed between the radially inner and radially outer platforms and that open to the internal cavity for directing cooling air from within said one of the first and second cavities to the internal cavity.

11. The component of claim 10, wherein a second of the first and second cavities is free of sidewall openings.

12. The component of claim 10, wherein a second of the first and second cavities comprises a quantity of sidewall openings that is less than a quantity of sidewall openings of said one of the first and second cavities.

13. The component of claim 10, wherein a portion of the plurality of sidewall openings are disposed on the leading edge of the baffle.

14. The component of claim 1, wherein said one of the radially inner and outer platforms is said radially outer platform.

15. The component of claim 1, wherein said one of the radially inner and outer platforms is said radially inner platform.

16. The component of claim 1, wherein said body having an airfoil comprises a stator vane.

17. A gas turbine engine comprising:
a compressor section;
a combustor section in fluid communication with the compressor section;
a turbine section in fluid communication with the combustor section, the turbine section including an engine component that extends between a radially inner platform and a radially outer platform and comprises an airfoil having an internal cavity;
a baffle disposed within the internal cavity, the baffle defining first and second baffle cavities that are separated by a baffle dividing wall extending between the radially inner platform and the radially outer platform; and
an impingement plate spaced apart from one of the radially inner and outer platforms, the impingement plate comprising a first opening that provides fluid communication between a first chamber and the first baffle cavity, and a plurality of second openings that are smaller than the first opening and provide fluid communication between the first chamber and the second baffle cavity via a second chamber, the first chamber in fluid communication with a source of cooling air;
wherein the impingement plate is free of openings within a profile of the second baffle cavity.

18. The gas turbine engine of claim 17, wherein the first baffle cavity extends in a radial direction beyond said one of the inner and outer diameter platforms to the impingement plate at a first end, and a terminal end of the second baffle cavity proximate to said one of the radially inner and outer platforms is spaced apart from the impingement plate.

19. The gas turbine engine of claim 17, wherein one of the first and second baffle cavities is disposed along a leading edge of the baffle and comprises a plurality of sidewall openings that are disposed between the radially inner and outer platforms and that open to the internal cavity for directing cooling air from within said one of the first and second cavities to the internal cavity.

20. The gas turbine engine of claim 17, comprising a U-shaped collar extending between said one of the radially inner and outer platforms and said impingement plate and surrounding a portion of the baffle, the U-shaped collar comprising an edge that terminates at said one of the radially inner and outer platforms.

21. A component for a gas turbine engine comprising:
a body having an airfoil extending between a radially inner platform and a radially outer platform, and having an internal cavity within the airfoil;
a baffle disposed within the internal cavity, the baffle defining first and second baffle cavities that are separated by a baffle dividing wall extending between the radially inner platform and the radially outer platform; and
an impingement plate spaced apart from one of the radially inner and outer platforms, the impingement plate comprising a first opening that provides fluid communication between a first chamber and the first baffle cavity, and a plurality of second openings that are smaller than the first opening and provide fluid communication between the first chamber and the second baffle cavity via a second chamber;
wherein said first baffle cavity is situated proximate to a trailing edge of said airfoil, and said second baffle cavity is situated proximate to a leading edge of said airfoil.

* * * * *